is2

(12) United States Patent
Oketani

(10) Patent No.: US 11,509,194 B2
(45) Date of Patent: Nov. 22, 2022

(54) MOTOR WITH ROTOR AND ENDPLATES WITH BLADE PARTS AND COOLING HOLE

(71) Applicant: Mitsubishi Electric Corporation, Tokyo (JP)

(72) Inventor: Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/483,240

(22) PCT Filed: Mar. 21, 2017

(86) PCT No.: PCT/JP2017/011132
§ 371 (c)(1),
(2) Date: Aug. 2, 2019

(87) PCT Pub. No.: WO2018/173104
PCT Pub. Date: Sep. 27, 2018

(65) Prior Publication Data
US 2020/0321830 A1    Oct. 8, 2020

(51) Int. Cl.
*H02K 9/06*      (2006.01)
*H02K 1/276*   (2022.01)
(Continued)

(52) U.S. Cl.
CPC .............. *H02K 9/06* (2013.01); *H02K 1/276* (2013.01); *H02K 1/32* (2013.01); *H02K 5/207* (2021.01);
(Continued)

(58) Field of Classification Search
CPC .. H02K 9/00; H02K 9/02; H02K 9/04; H02K 9/06; H02K 9/08; H02K 9/12;
(Continued)

(56) References Cited

U.S. PATENT DOCUMENTS 2,773,203 A * 12/1956 Opel ..................... H02K 1/32
310/61
2,900,538 A *  8/1959 Tudge .................... H02K 3/24
310/59
(Continued)

FOREIGN PATENT DOCUMENTS

CN         203674892 U     6/2014
JP         H09-182376 A    7/1997
(Continued)

OTHER PUBLICATIONS

US 10,892,655 B2, 01/2021, Shono (withdrawn)*
(Continued)

*Primary Examiner* — Maged M Almawri
(74) *Attorney, Agent, or Firm* — Posz Law Group, PLC

(57) ABSTRACT

A motor comprises a rotor including: a rotor core to rotate on a rotary shaft; a permanent magnet inserted in a magnet insertion hole formed in the rotor core; first and second end plates provided on both end faces of the rotor core respectively in a direction of the rotary shaft; and a blade part provided on a surface of the first end plate to surround the rotary shaft. The rotor includes a cooling hole having an opening between the blade part of the first end plate and the rotary shaft and passing through the rotor core and the second end plate.

7 Claims, 8 Drawing Sheets

(51) Int. Cl.
*H02K 21/14* (2006.01)
*H02K 1/32* (2006.01)
*H02K 5/20* (2006.01)

(52) U.S. Cl.
CPC ......... *H02K 21/14* (2013.01); *H02K 2205/09* (2013.01)

(58) Field of Classification Search
CPC ............ H02K 1/276; H02K 1/32; H02K 1/28; H02K 5/20; H02K 2205/09; H02K 21/14
USPC ......... 310/216.114, 58, 61, 59, 60 R, 68, 67, 310/64, 67 R, 40 MM; 360/99; 219/678
See application file for complete search history.

(56) References Cited

U.S. PATENT DOCUMENTS

| | | | | |
|---|---|---|---|---|
| 4,797,602 | A * | 1/1989 | West | F02N 11/04 290/46 |
| 5,925,960 | A * | 7/1999 | Hayes | H02K 17/165 310/211 |
| 6,323,568 | B1 * | 11/2001 | Zabar | H02K 33/04 310/12.24 |
| 6,345,956 | B1 * | 2/2002 | Lin | F04D 29/282 415/119 |
| 6,762,527 | B1 * | 7/2004 | Horng | H02K 1/2793 310/156.18 |
| 6,815,849 | B2 * | 11/2004 | Serizawa | H02K 9/06 310/156.26 |
| 8,368,268 | B2 * | 2/2013 | Hasegawa | G02B 21/248 359/381 |
| 9,906,109 | B2 * | 2/2018 | Endo | H02K 33/16 |
| 10,116,178 | B2 * | 10/2018 | Horii | H02K 1/28 |
| 10,447,133 | B2 * | 10/2019 | Jin | H02K 33/18 |
| 10,547,233 | B2 * | 1/2020 | Jin | H02K 5/04 |
| 10,594,191 | B2 * | 3/2020 | Goldstein | H02K 5/203 |
| 11,309,808 | B1 * | 4/2022 | Li | H02N 1/04 |
| 2001/0010434 | A1 * | 8/2001 | Ishida | F04D 29/281 310/43 |
| 2004/0145254 | A1 * | 7/2004 | Buening | F04D 29/281 310/62 |
| 2006/0208593 | A1 * | 9/2006 | Park | H02K 1/276 310/156.53 |
| 2006/0226717 | A1 * | 10/2006 | Nagayama | H02K 9/14 310/58 |
| 2007/0120434 | A1 * | 5/2007 | Oh | H02K 7/085 310/168 |
| 2008/0193275 | A1 * | 8/2008 | De Filippis | H02K 5/20 415/10 |
| 2009/0261679 | A1 * | 10/2009 | Sakai | H02K 29/03 310/156.53 |
| 2011/0133577 | A1 * | 6/2011 | Lee | H02K 33/18 310/15 |
| 2011/0316361 | A1 * | 12/2011 | Park | H02K 33/16 310/25 |
| 2012/0086291 | A1 * | 4/2012 | DeBlock | H02K 1/20 310/61 |
| 2014/0035397 | A1 * | 2/2014 | Endo | H02K 33/18 310/30 |
| 2015/0137628 | A1 * | 5/2015 | Endo | H02K 33/16 310/25 |
| 2015/0357869 | A1 * | 12/2015 | Ikuta | H02K 9/223 310/45 |
| 2016/0164389 | A1 * | 6/2016 | Jang | H02K 7/116 310/20 |
| 2016/0261158 | A1 * | 9/2016 | Horii | H02K 1/274 |
| 2018/0250107 | A1 * | 9/2018 | Dai | A61C 17/221 |
| 2018/0278126 | A1 * | 9/2018 | Goldstein | H02K 5/203 |
| 2019/0044425 | A1 * | 2/2019 | Zu | H02K 33/18 |
| 2019/0151895 | A1 * | 5/2019 | Takahashi | H02K 33/18 |
| 2019/0190337 | A1 * | 6/2019 | Shono | F04B 35/04 |
| 2019/0319505 | A1 * | 10/2019 | Degner | H02K 7/003 |

FOREIGN PATENT DOCUMENTS

| | | | |
|---|---|---|---|
| JP | 2000-083350 | A | 3/2000 |
| JP | 2000-333409 | A | 11/2000 |
| JP | 2002-345188 | A | 11/2002 |
| JP | 2006-271081 | A | 10/2006 |
| JP | 2008-541686 | A | 11/2008 |
| JP | 2009-177944 | A | 8/2009 |
| JP | 2009177944 | A * | 8/2009 |
| JP | 2010-252598 | A | 11/2010 |
| JP | 2011-254573 | A | 12/2011 |
| JP | 2013-013229 | A | 1/2013 |
| JP | 2013-124573 | A | 6/2013 |
| JP | 2015-149855 | A | 8/2015 |
| JP | 2016-111866 | A | 6/2016 |
| WO | 2015/087445 | A1 | 6/2015 |

OTHER PUBLICATIONS

JP-2009177944-A English Translation.*
Office Action dated Oct. 23, 2020 in the corresponding CN patent application No. 201780086337.0 (with English translation).
Office Action dated Apr. 14, 2020 in the corresponding JP patent application No. 2019-506571 (with English translation).
Office Action dated May 20, 2021 in the corresponding CN patent application No. 201780086337.0 (with English translation).
Office Action dated Jan. 5, 2022 in the corresponding CN patent application No. 201780086337.0 (with English translation).
Decision of Refusal dated Apr. 6, 2022 in connection with counterpart Chinese Patent Application No. 201780086337.0 (with English machine translation).
International Search Report of the International Searching Authority dated Jun. 13, 2017 for the corresponding International application No. PCT/JP2017/011132 (and English translation).

* cited by examiner

MOTOR WITH ROTOR AND ENDPLATES WITH BLADE PARTS AND COOLING HOLE

CROSS REFERENCE TO RELATED APPLICATION

This application is a U.S. national stage application of International Patent Application No. PCT/JP2017/011132 filed on Mar. 21, 2017, the disclosure of which is incorporated herein by reference.

TECHNICAL FIELD

The present invention relates to a motor and a blower.

BACKGROUND

In motors in recent years, output power density is increasing due to downsizing and weight reduction and the amount of heat emission is increasing. Especially in a motor including a rare-earth magnet embedded in a rotor, a temperature rise of the rotor lowers magnetic force and coercive force of the rare-earth magnet and that leads to a drop in inductive voltage and demagnetization resistance. Therefore, a cooling technology for cooling down the rotor is being requested.

As a conventional cooling technology, there has been proposed a technology of cooling down the rotor by feeding a cooling medium through a heat transfer member inserted in a rotary shaft direction of the rotor. In this motor, when the rotor rotates, the cooling medium in the motor flows into the inside of the heat transfer member, and thus the rotor is cooled down from inside by the passage of the cooling medium (see Patent Reference 1, for example).

PATENT REFERENCE

Patent Reference 1: Japanese Patent Application Publication No. 2011-254573

In the conventional motor described above, when pressure difference between both ends of the rotor in the rotary shaft direction is small, the inflow of the cooling medium into the inside of the heat transfer member decreases. Accordingly, there is a problem in that the flow rate of the cooling medium flowing inside the heat transfer member decreases and the cooling becomes insufficient.

SUMMARY

An object of the present invention, which has been made to resolve the above-described problem, is to provide a motor having increased coolability of the rotor. Another object of the present invention is to provide a blower including the motor.

A motor according to the present invention includes a rotor including: a rotor core to rotate on a rotary shaft; a permanent magnet inserted in a magnet insertion hole formed in the rotor core; first and second end plates provided on both end faces of the rotor core respectively in an axial direction. The first end plate includes a base part covering one end of the magnet insertion hole, and a blade part provided on a surface of the base part. The rotor includes a cooling hole having an opening between the blade part of the first end plate and the rotary shaft and passing through the rotor core and the second end plate.

In the motor according to the present invention, when the rotor rotates in a state in which a cooling medium exists in the motor, negative pressure is caused on a part of the first end plate in the vicinity of the rotary shaft by the blade part provided on the first end plate and the pressure difference between both ends of the rotor in a direction of the rotary shaft increases. With this pressure difference, the flow rate of the cooling medium flowing through the cooling hole increases and the coolability of the rotor can be increased.

DETAILED DESCRIPTION

First Embodiment

Figure 1:
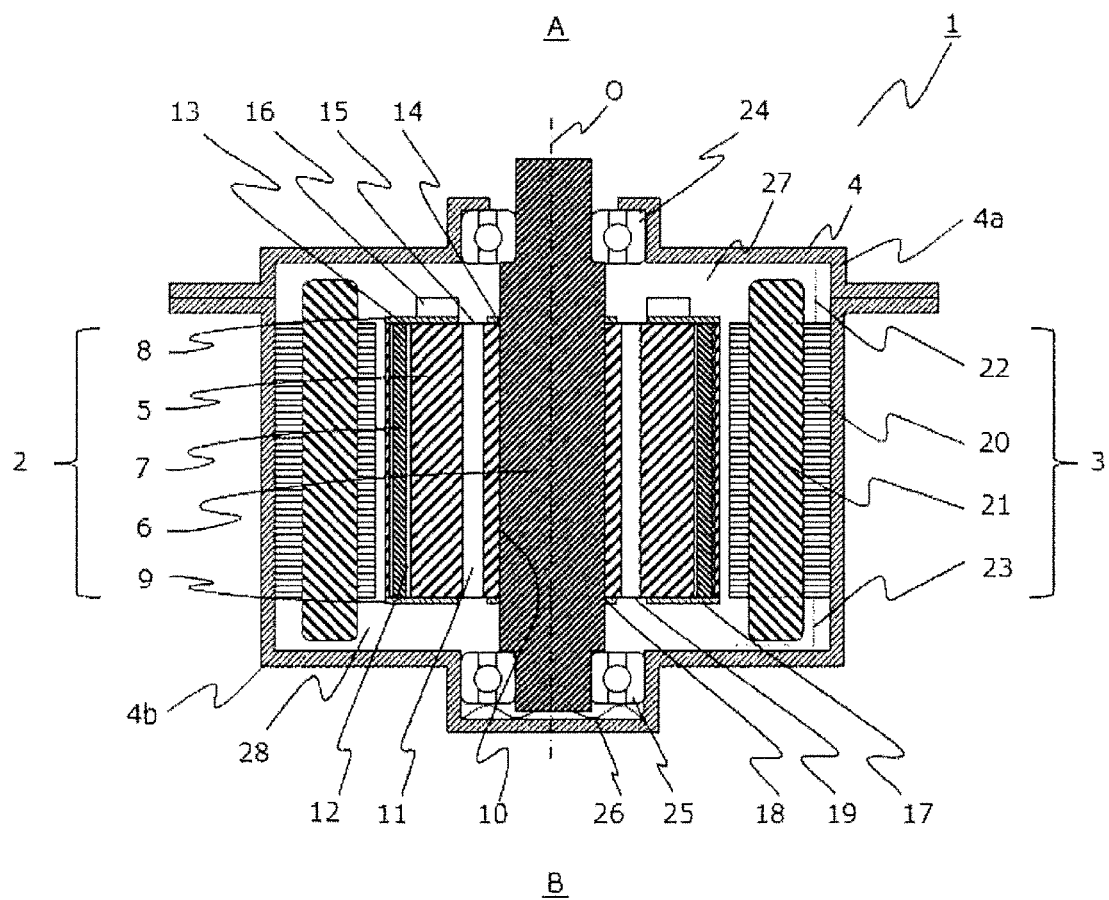
FIG. 1 is a cross-sectional view of a motor according to a first embodiment of the present invention.

Internal structure of a motor in a first embodiment of the present invention will be described below with reference to FIG. 1.

The motor 1 includes a rotor 2, a stator 3 and a case 4. The case 4 is formed of a frame 4a and a frame 4b. The motor 1 is placed in the air, for example. Incidentally, the following description will be given by referring to the frame 4a side in FIG. 1 in an axial direction as a side A and the frame 4b side in FIG. 1 in the axial direction as a side B and assuming that the side A is a load side in charge of input/output of torque to/from the motor 1 and the side B is an anti-load side. The reference character O in FIG. 1 represents a shaft center of a rotary shaft 6 which will be described later, and the rotor 2 is configured to rotate on the shaft center O.

The rotor 2 includes a rotor core 5, the rotary shaft 6, a plurality of permanent magnets 7, an end plate 8, and an end plate 9.

The rotor core 5 is formed by stacking and fixing together a plurality of electromagnetic steel sheets. The electromagnetic steel sheets are plate-like members punched out in a predetermined shape (e.g., circular shape). In a central part of the rotor core 5, a shaft hole 10 is formed to penetrate the central part. Further, a plurality of through holes 11 passing through the rotor core 5 in the axial direction of the rotary shaft 6 and a plurality of magnet insertion holes 12 are formed in the rotor core 5.

The through holes 11 are formed around the shaft hole 10 and a cooling medium which will be described later circulates in the through holes 11. The through holes 11 are formed inside the magnet insertion holes 12 in a radial direction. The through hole 11 is fan-shaped, for example, in a cross section orthogonal to the shaft center O.

Incidentally, the shape of the through hole 11 in a cross section orthogonal to the shaft center O is just an example for illustration and is not limited to this example. The through hole 11 may also be formed in a circular shape since pressure loss deceases and a higher flow rate of the cooling medium can be secured as the shape of the through hole 11 approaches a circular shape. It is also possible to determine the shape of the through hole 11 in consideration of securing sufficient strength of a part around the through hole 11 against torsion and centrifugal force.

The rotary shaft 6 is inserted in the shaft hole 10 formed in the rotor core 5 and fixed to the rotor core 5. With this configuration, the rotor core 5 rotates on the shaft center O. An end part of the rotary shaft 6 on the side A is rotatably supported by the frame 4*a*. An end part of the rotary shaft 6 on the side B is rotatably supported by the frame 4*b*. The rotary shaft 6 is in a circular shape, for example, in a cross section orthogonal to the shaft center O.

The permanent magnets 7 are inserted in the magnet insertion holes 12 formed in the rotor core 5. The permanent magnet 7 is a rare-earth magnet (e.g., Nd—Fe—B sintered magnet, Sm—Fe—N bonded magnet or the like). The shape of the permanent magnet 7 is a rectangular prism, for example, and is a rectangular shape in a cross section orthogonal to the shaft center O.

The end plate 8 is provided on an end face of the rotor core 5 on the side A. The end plate 8 includes a base part 13 arranged on the end face of the rotor core 5 on the side A. The base part 13 is a plate-like member in a circular shape, for example. A hole 14 through which the rotary shaft 6 penetrates and holes 15 communicating with the through holes 11 formed in the rotor core 5 are formed in the base part 13. The end plate 8 further includes a plurality of blades 16 extending outward from the rotor core 5. Incidentally, the end plate 8 corresponds to a first end plate in the present invention. Further, the blades 16 correspond to a blade part in the present invention.

The end plate 9 is provided on an end face of the rotor core 5 on the side B. The end plate 9 includes a base part 17 arranged on the end face of the rotor core 5 on the side B. The base part 17 is a plate-like member in a circular shape, for example. A hole 18 through which the rotary shaft 6 penetrates and holes 19 communicating with the through holes 11 formed in the rotor core 5 are formed in the base part 17. The end plate 9 is not provided with parts corresponding to the blades 16 provided on the end plate 8. Incidentally, the end plate 9 corresponds to a second end plate in the present invention.

Here, the end plate 8 and the end plate 9 are provided on both end faces of the rotor core 5 respectively in the axial direction of the rotary shaft 6. Further, the end plate 8 and the end plate 9 cover openings of the plurality of magnet insertion holes 12 on both end faces of the rotor core 5 in the axial direction and thereby prevent the permanent magnets 7 from coming out from the magnet insertion hole 12. Examples of means for attaching the end plate 8 and the end plate 9 to the rotor core 5 include welding, gluing, fastening by forming through holes and using bolts or rivets, press fitting by forming a spigot part, and so forth.

Incidentally, holes formed by the connection of the holes 15 formed in the end plate 8, the through holes 11 formed in the rotor core 5, and the holes 19 formed in the end plate 9 correspond to cooling holes in the present invention. That is, cooling holes having openings on the end plate 8 and passing through the rotor core 5 and the end plate 9 are formed in the rotor 2. Further, the rotary shaft 6 penetrates the end plate 8, the rotor core 5 and the end plate 9.

The stator 3 is arranged outside the rotor 2. The stator 3 includes a stator core 20 and a winding 21.

The stator core 20 is formed by stacking and fixing together a plurality of electromagnetic steel sheets punched out in a predetermined shape. The stator core 20 is in a substantially circular ring shape, for example, in a cross section orthogonal to the shaft center O. In an inner part of the stator core 20 in the radial direction, a plurality of teeth (not shown) are arranged at even intervals in a radial pattern and tip ends of the teeth face an outer circumferential surface of the rotor core 5 via a predetermined gap.

The winding 21 is wound around the teeth via an insulator (not shown) made of an insulating material. The winding 21 has a coil end part 22 and a coil end part 23 extending further in the axial direction than the stator core 20. The coil end part 22 projects towards the side A further than an end face of the stator core 20 on the side A. The coil end part 23 projects towards the side B further than an end face of the stator core 20 on the side B. The coil end part 22 is situated at a position facing the blades 16 formed on the end plate 8. In other words, the rotor 2 is arranged so that the blades 16 face the coil end part 22.

The frame 4*a* supports the end part of the rotary shaft 6 on the side A via a bearing 24. The frame 4*a* is in a substantially cylindrical shape, for example, one end of the frame 4*a* in the axial direction is open and forms a brim-like shape, and the other end of the frame 4*a* has a hole formed to let one end of the rotary shaft 6 project therefrom.

The frame 4*b* supports the end part of the rotary shaft 6 on the side B via a bearing 25. The frame 4*b* is in a substantially cylindrical shape, for example, one end of the frame 4*b* in the axial direction is open and forms a brim-like shape, and a bottom is formed at the other end of the frame 4*b*. A compression spring 26 is arranged to be sandwiched between the bottom of the frame 4*b* and the bearing 25 and gives predetermined preload to the bearing 24 and the bearing 25. A wave washer or the like is used as the compression spring 26, for example.

The frame 4*a* and the frame 4*b* are connected together, with their brim-like parts contacting each other, by using fastening means such as screws (not shown) and a space is formed inside. The rotor 2 and the stator 3 are housed in the interior space. In the interior space, a space 27 is formed between the end face of the rotor 2 on the side A and the frame 4*a*. Further, a space 28 is formed between the end face of the rotor 2 on the side B and the frame 4*b*. Incidentally, the frame 4*a* and the frame 4*b* correspond to the case in the present invention.

Openings (not shown) are formed in the frame 4*a* and the frame 4*b* to connect the space 27 and the space 28 as the interior space of the case 4 to the outside of the case 4. Incidentally, the positions of the brim-like parts formed on the frame 4*a* and the frame 4*b* are not limited to the positions shown in FIG. 1.

Figure 2:
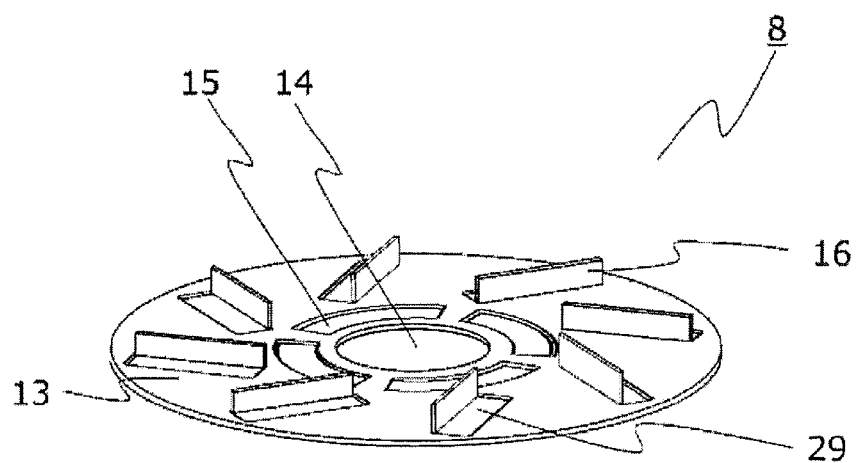
FIG. 2 is a perspective view of an end plate included in the motor according to the first embodiment of the present invention.

Next, a schematic configuration of the end plate 8 in the first embodiment will be described below with reference to FIG. 2 and FIG. 3. FIG. 2 is a perspective view of the end plate 8. The end plate 8 includes the base part 13 and eight blades 16 formed by cut and raise processing of the base part 13. Thus, the blades 16 are formed integrally with the base part 13. Further, the base part 13 has eight holes 29 formed by the cut and raise processing of the blades 16. Incidentally, the blades 16 may also be formed by a method other than the cut and raise processing of the base part 13. For example, the blades 16 may be formed by gluing plate-like members to the base part 13.

Figure 3:
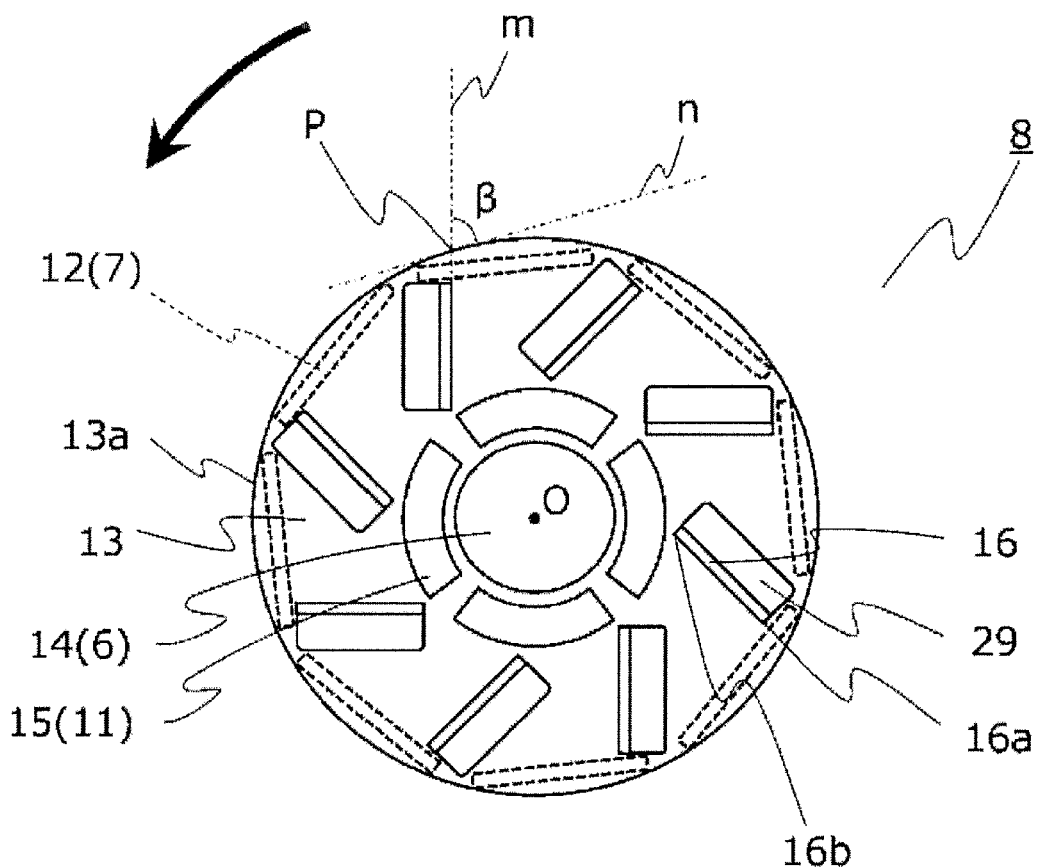
FIG. 3 is a diagram showing a schematic configuration of the end plate included in the motor according to the first embodiment of the present invention.

FIG. 3 is a diagram showing the end plate 8 viewed in the axial direction. Incidentally, an arrow in FIG. 3 indicates the rotation direction of the rotor 2 and FIG. 3 shows an example in which the rotation direction of the rotor 2 is the counter-clockwise direction. Broken lines in FIG. 3 indicate positions facing the magnet insertion holes 12 in a state in which the end plate 8 has been attached to the rotor core 5. The magnet insertion holes 12 are formed at substantially even intervals in a circumferential direction of the end plate 8 outside the through holes 11 in the radial direction.

The hole 14 in which the rotary shaft 6 is inserted, four holes 15 communicating with the through holes 11 formed in the rotor core 5, and the eight holes 29 formed by the cut and raise processing of the blades 16 are formed in the base part 13 of the end plate 8.

Incidentally, eight magnet insertion holes 12 are formed similarly to the eight blades 16 and holes 29. A part of the blade 16 or hole 29 is formed at a position between adjacent magnet insertion holes 12. The hole 29 is formed at a position not overlapping with a magnet insertion hole 12 formed in the rotor core 5. Thus, one end of the magnet insertion hole 12 is covered with the base part 13 of the end plate 8. Although not shown, the other end of the magnet insertion hole 12 is covered with the base part 17 of the end plate 9.

The holes 15 are formed between the rotary shaft 6 and the blades 16 as viewed in the axial direction. The hole 15 has substantially the same size and shape as the through hole 11 formed in the rotor core 5. Thus, the hole 15 is fan-shaped, for example, in a cross section orthogonal to the shaft center O. Four holes 15 are formed similarly to the four through holes 11, and the holes 15 and the through holes 11 overlap with each other as viewed in the axial direction.

Incidentally, the above-described numbers of the magnet insertion holes 12, the holes 15, the blades 16 and the holes 29 are just an example for illustration and do not limit the numbers of these components. For example, it is possible to form the same number of magnet insertion holes 12, holes 15, blades 16 and holes 29. It is also possible to form the magnet insertion holes 12, the holes 15, the blades 16 and the holes 29 in different numbers.

The blades 16 are provided on a surface of the base part 13 of the end plate 8 to surround the rotary shaft 6. An end part 16a of the blade 16 outside in the radial direction is arranged outside the hole 15 in the radial direction. Further, an end part 16b of the blade 16 inside in the radial direction is arranged outside the hole 15 in the radial direction.

In the blade 16, the end part 16a outside in the radial direction is situated at the rear of the end part 16b inside in the radial direction in the rotation direction of the rotor 2. Let m represent an extension line passing through the end part 16a of the blade 16 outside in the radial direction and the end part 16b of the blade 16 inside in the radial direction, P represent an intersection point of the extension line m and an outer circumferential part 13a of the base part 13, n represent a tangential line to the outer circumferential part 13a at the intersection point P, and an outlet angle β represent an angle formed by the extension line m and the tangential line n, the outlet angle β satisfies β<90°. That is, the plurality of blades 16 constitute a backward fan.

Figure 4:
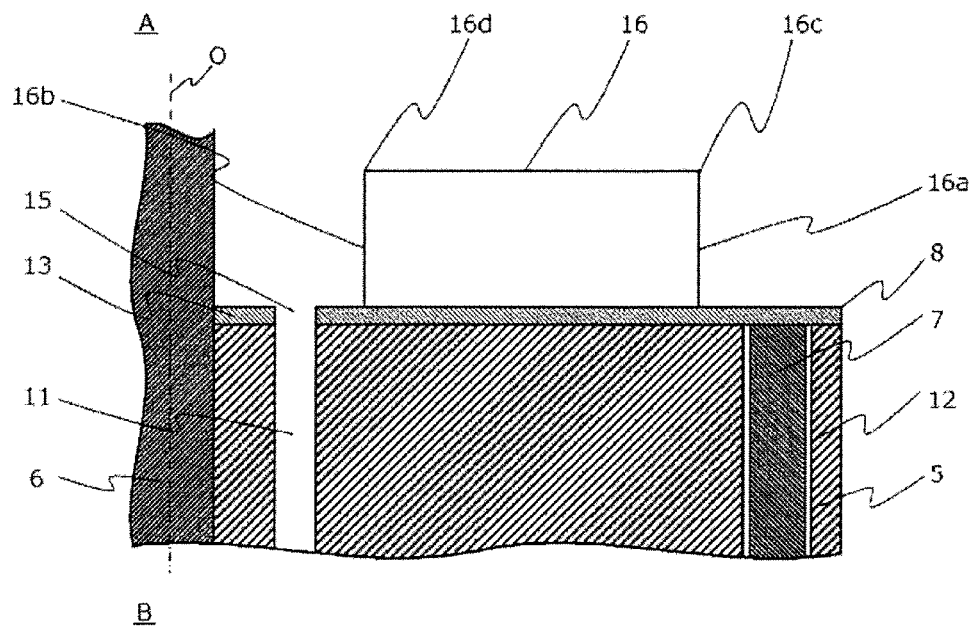
FIG. 4 is a diagram showing a schematic configuration of a blade of the motor according to the first embodiment of the present invention.

Next, the shape of the blade 16 in the first embodiment will be described in detail below with reference to FIG. 4. The blade 16 is in a rectangular shape as viewed in a direction orthogonal to the shaft center O. The blade 16 has the end part 16a outside in the radial direction and the end part 16b inside in the radial direction. The end part 16a has an outside tip end part 16c farthest from the base part 13. The end part 16b has an inside tip end part 16d farthest from the base part 13. The outside tip end part 16c and the inside tip end part 16d are connected to each other. Heights of the outside tip end part 16c and the inside tip end part 16d (lengths from the base part 13 to the outside tip end part 16c and the inside tip end part 16d) are the same as each other. Forming the blade 16 in a rectangular shape has an advantage in that the processing is easy.

With the increase in the length of the blade 16 in the radial direction, that is, the length from the end part 16a to the end part 16b, pressure difference between the end parts increases. Further, with the increase in the heights of the outside tip end part 16c and the inside tip end part 16d of the blade 16, the area of the blade 16 increases and a greater amount of cooling medium can be moved. These heights may be determined in consideration of the area of the end plate 8 and energy loss.

Figure 5:
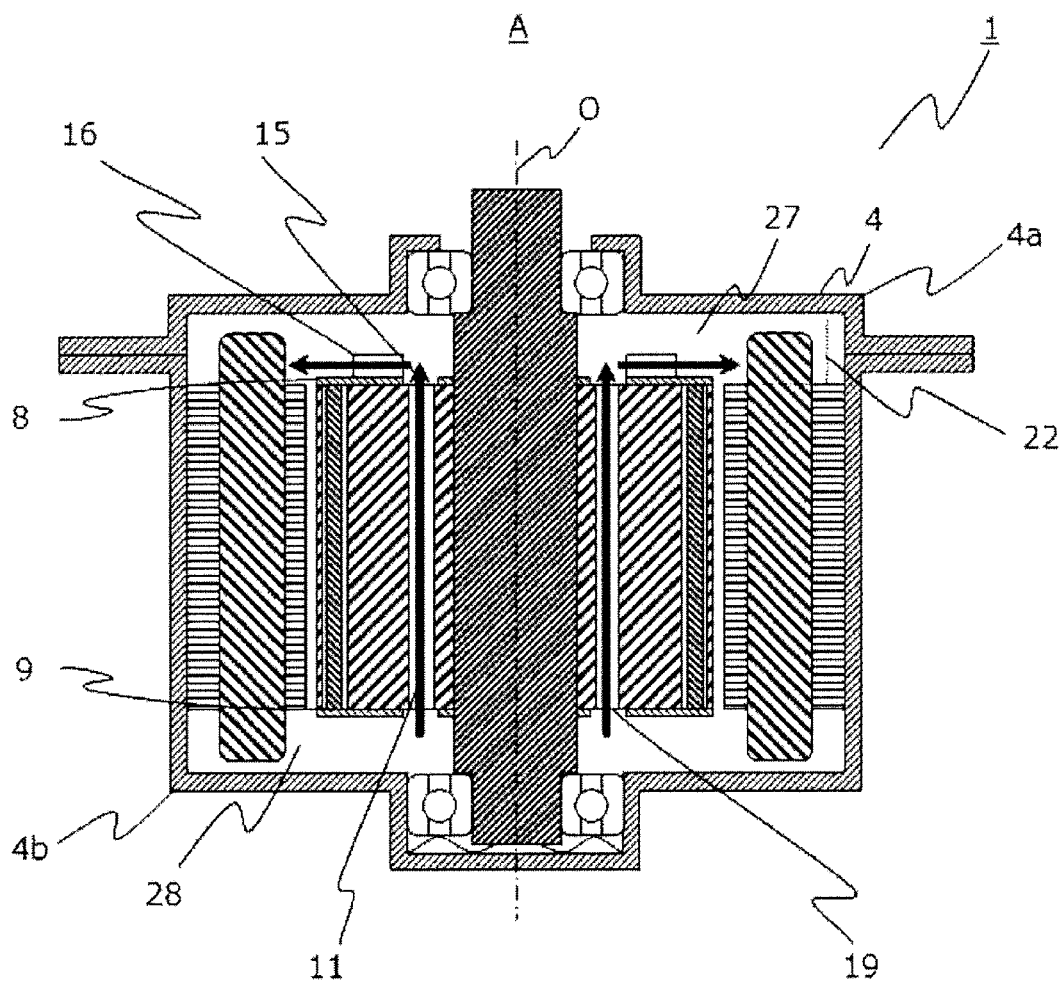
FIG. 5 is a diagram for explaining a cooling operation of the motor according to the first embodiment of the present invention.

Next, a cooling operation of the motor in the first embodiment will be described below with reference to FIG. 5. The cooling medium for cooling the rotor 2 and the stator 3 circulates in the motor 1. In the first embodiment, the description will be given on the assumption that the cooling medium is air. Incidentally, arrows in FIG. 5 indicate the flow of air.

In the operation of the motor 1, namely, when the rotor 2 is rotating, the temperature of the rotor 2 rises due to heat generation caused by iron loss of the rotor core 5 and eddy current occurring in the permanent magnets 7. Further, the temperature of the winding 21 rises due to heat generation caused by copper loss of the winding 21 and iron loss of the stator core 20.

When the rotor 2 rotates, the plurality of blades 16 provided on the end plate 8 function as a centrifugal fan. In this case, pressure difference occurs between the end part 16a side and the end part 16b side of the blade 16 and negative pressure occurs in a central part of the end plate 8, that is, a part in the vicinity of the rotary shaft 6. Pressure difference occurs also between the space 27 and the space 28 and the pressure in the space 27 becomes lower than the pressure in the space 28. Due to this pressure difference, a flow of air heading from the end plate 9 side to the end plate 8 side is formed in the through holes 11.

When the pressure difference between the space 27 and the space 28 increases in the case 4, air outside the case 4 flows into the space 28 through the opening formed on the frame 4b. A part of the air flowing into the space 28 flows into the through holes 11 formed in the rotor core 5 through the holes 19 formed in the end plate 9. The air that flowed through the through holes 11 blows out to the space 27 from the holes 15 formed in the end plate 8. A part of the air blowing out from the holes 15 is blown off outward in the radial direction by the blades 16 formed on the end plate 8. A part of the air blown off by the blades 16 hits the coil end part 22 and flows outside the case 4 through the opening formed in the frame 4a.

As above, the end plate 8 is arranged on a downstream side of the end plate 9 in the air flow direction. Further, since the blades 16 constituting the centrifugal fan are provided on the end plate 8 on the downstream side, negative pressure occurs on a part of the end plate 8 in the vicinity of the rotary shaft 6 and the pressure difference between both ends of the rotor 2 in the direction of the rotary shaft 6 increases. By use of this pressure difference, it is possible to make air flow through the through holes 11. Then, the air flowing through the through holes 11 absorbs heat from the rotor core 5 and the rotor 2 is cooled down.

With such a configuration, coolability of the rotor 2 increases. Further, since the flow of air is formed by use of pressure difference, the flow rate of the air flowing inside the rotor 2 can be increased and the coolability of the rotor 2 can be increased even in a case where the motor 1 is used in an environment in which the pressure difference between both ends of the rotor 2 in the axial direction is small.

Furthermore, since the holes 15 in the end plate 8 are formed in the vicinity of the rotary shaft 6, the length of the blade 16 in the radial direction, that is, the length from the end part 16a to the end part 16b can be made long and the flow rate of the air flowing in the through holes 11 can be increased compared to a case where the holes 15 are formed at positions more outside in the radial direction.

On the end plate 8, the holes 15 are formed more inside in the radial direction than the end parts 16b of the blades 16 inside in the radial direction, and thus the whole area of the blades 16 can be used to move the air blowing out from the holes 15 outward in the radial direction and the blades 16 can be used efficiently.

Since the blades 16 are arranged at positions facing the coil end part 22 of the winding 21, the air blown off by the blades 16 outward in the radial direction of the end plate 8 hits the coil end part 22. Accordingly, the winding 21 can be cooled down concurrently with the rotor 2.

Since the end part 16a of the blade 16 outside in the radial direction is arranged to the rear of the end part 16b inside in the radial direction in the rotation direction and the outlet angle β of the blade 16 is set to satisfy β<90°, the negative pressure in the vicinity of the center of the end plate 8 can be increased and the flow rate of the air flowing through the through holes 11 can be increased compared to a case where β≥90°.

Since the magnet insertion holes 12 formed in the rotor core 5 are covered with the end plate 8 and the end plate 9, even when a permanent magnet 7 breaks during the operation of the motor 1, it is possible to reduce the occurrence of secondary damage such as a fragment of the permanent magnet 7 popping out from the rotor 2 and getting stuck between the rotor 2 and the stator 3.

Since the magnet insertion holes 12 are formed at substantially even intervals in the circumferential direction of the rotor core 5 and a part of the blade 16 and hole 29 is formed at a position between adjacent magnet insertion holes 12, the length of the blade 16 in the radial direction, that is, the length from the end part 16a to the end part 16b can be made long.

Since the blades 16 are formed integrally with the end plate 8 by the cut and raise processing of the base part 13, the number of parts does not increase and the production cost can be reduced.

Incidentally, the end plate 9 may be provided with a member that promotes raking of air into the holes 19 differently from the blades 16 provided on the end plate 8. With such a configuration, the flow of air into the through holes 11 formed in the rotor core 5 through the holes 19 increases and the permanent magnets 7 can be cooled down efficiently.

Next, modifications of the first embodiment will be described below. In the above first embodiment, the description has been given of an example in which the shapes, the numbers and the sizes of the through holes 11 and the holes 15 in a cross section orthogonal to the shaft center O are the same as each other, this is just an example for illustration and does not limit these features. It is permissible if the holes 15 connect with the through holes 11.

Figure 6:
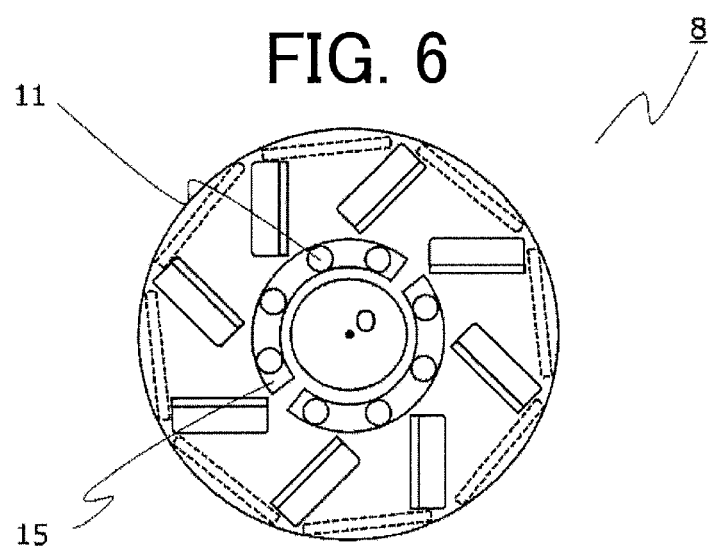
FIG. 6 is a diagram showing a modification of the motor according to the first embodiment of the present invention.

For example, as shown in FIG. 6, it is possible to set the shape and the number of the through holes 11 in a cross section orthogonal to the shaft center O as a circular shape and eight, set the shape and the number of the holes 15 in a cross section orthogonal to the shaft center O as a fan-like shape and two, and set the size of the hole 15 larger than that of the through hole 11. A decrease in the flow rate due to pressure loss between the through holes 11 and the holes 15 can be inhibited if the openings of the through holes 11 are exposed without being covered by the end plate 8. Further, if the hole 15 is formed large irrespective of the size of the through hole 11, the production cost can be reduced since a common end plate can be employed for rotor cores differing in the arrangement of the through holes 11.

Further, while the description has been given of an example in which the hole 15 is arranged more inside in the radial direction than the end part 16b of the blade 16 inside in the radial direction, it is permissible if the hole 15 is arranged more inside in the radial direction than the end part 16a of the blade 16 outside in the radial direction. For example, the hole 15 may be arranged between the end part 16a and the end part 16b. The hole 15 may also be arranged between two adjacent blades 16. Further, the hole 15 may be arranged at a position separate from the blade 16. Air can be made to flow into the through holes 11 even if the holes 15 are not arranged in the vicinity of the blades 16 since air is made to flow into the holes 15 by using the pressure difference occurring on the end plate 8.

While the description in the above first embodiment has been given of an example in which the shape of the blade 16 is a rectangular shape as viewed in a direction orthogonal to the shaft center O, this is just an example for illustration and does not limit the shape.

Figure 7:
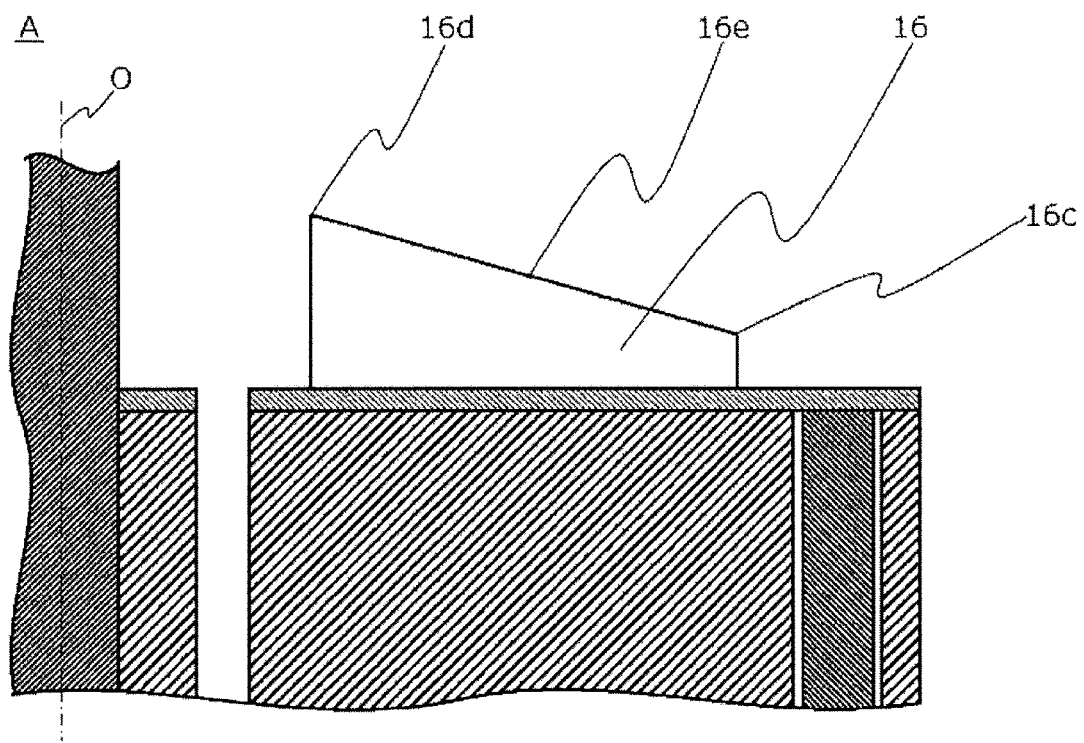
FIG. 7 is a diagram showing a modification of the motor according to the first embodiment of the present invention.

For example, the blade 16 may be in a trapezoidal shape as viewed in a direction orthogonal to the shaft center O as shown in FIG. 7. Specifically, the height of the outside tip end part 16c is set lower than the height of the inside tip end part 16d. Further, the blade 16 has an inclined part 16e connecting the outside tip end part 16c and the inside tip end part 16d together. Since the height of the inside tip end part 16d contributing to the work of moving air outward in the radial direction is set high and the height of the outside tip end part 16c is set low as above, the area of the blade 16 decreases compared to a case where the blade 16 is formed in a rectangular shape. With this configuration, air resistance decreases and the load on the motor 1 can be reduced.

Figure 8:
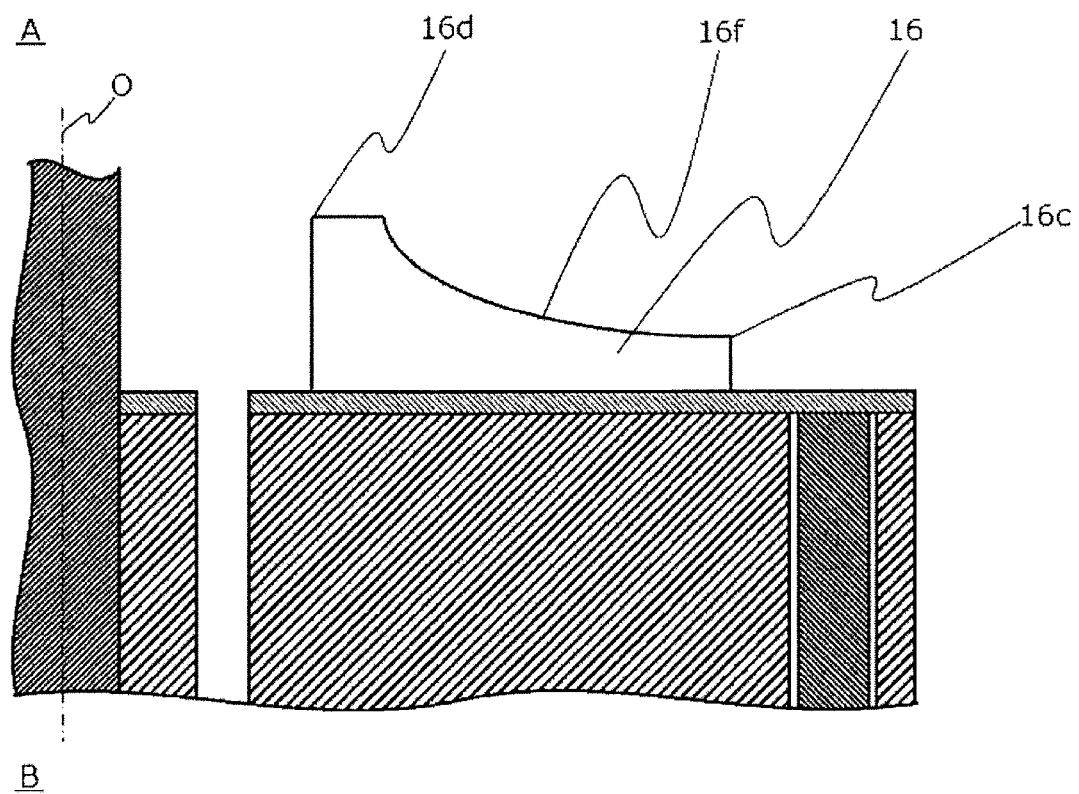
FIG. 8 is a diagram showing a modification of the motor according to the first embodiment of the present invention.

Further, as shown in FIG. 8, for example, the blade 16 may be formed to have a curved part 16f similarly to the shape of a blade constituting a commonly used centrifugal fan. With such a configuration, air resistance can be reduced compared to a case where the blade 16 is formed in a trapezoidal shape.

Second Embodiment

Figure 9:
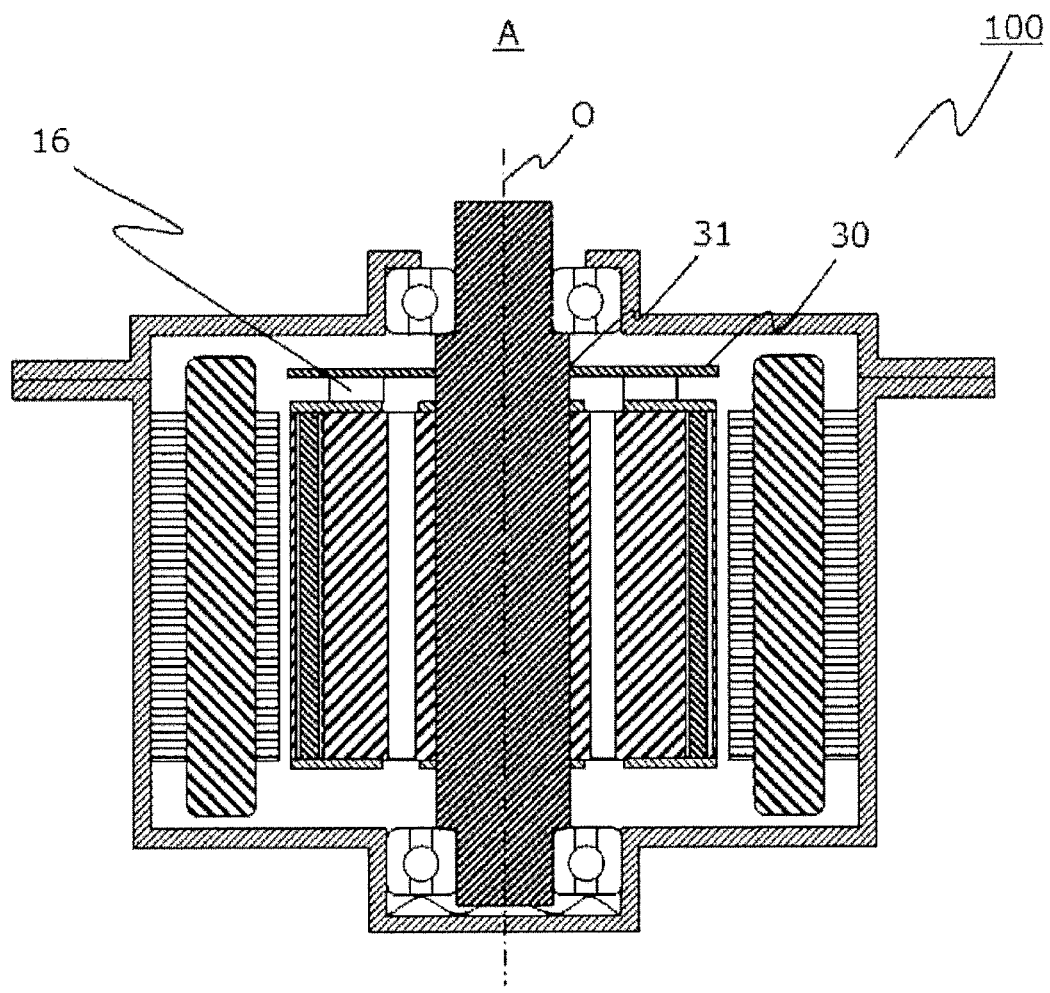
FIG. 9 is a cross-sectional view of a motor according to a second embodiment of the present invention.

Next, a motor 100 according to a second embodiment of the present invention will be described below with reference to FIG. 9. In the following description, unless otherwise noted, each component identical with a component in the first embodiment is assigned the same reference character as in the first embodiment and repeated explanation thereof is omitted.

The motor 100 includes a disk 30 provided on the tops of the blades 16. The disk 30 is fixed to the blades 16 by means of crimping, spot welding or the like. A hole 31 communicating with the shaft hole 10 and the hole 18 is formed in the disk 30. The rotary shaft 6 penetrates through the hole 31. In this case, the pressure difference between the ends of the rotor 2 increases and the coolability increases with the decrease in a clearance between the rotary shaft 6 and the disk 30.

Also with the motor 100 configured as above, advantages similar to those in the first embodiment are obtained.

Further, since the disk 30 covering the tops of the blades 16 is provided in the above-described second embodiment, the negative pressure on a part of the end plate 8 in the vicinity of the rotary shaft 6 increases further and the pressure difference between the space 27 and the space 28 also increases further in comparison with the first embodiment. Accordingly, the flow rate of air flowing through the through holes 11 increases and the coolability of the rotor 2 increases.

Third Embodiment

Figure 10:
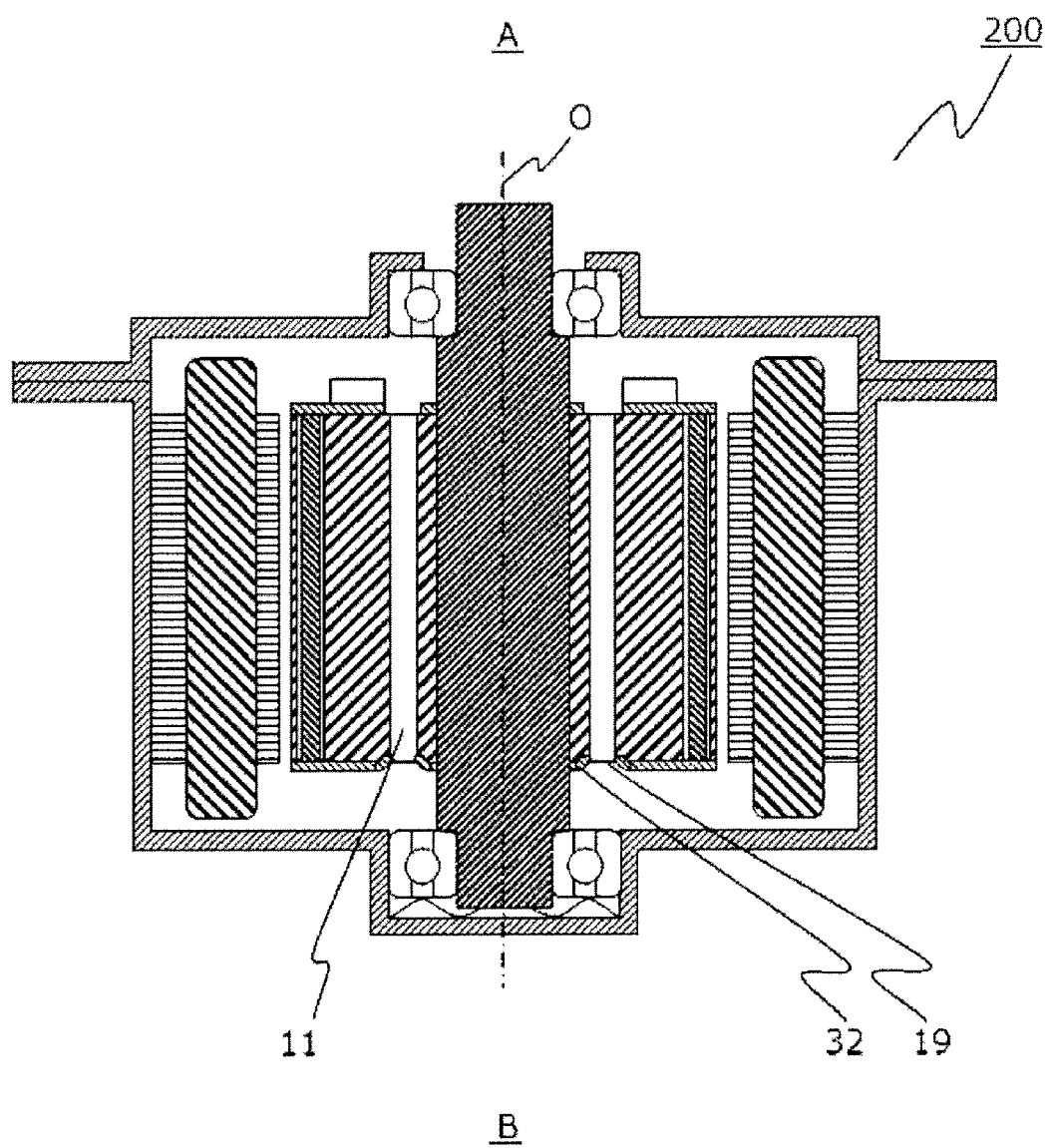
FIG. 10 is a cross-sectional view of a motor according to a third embodiment of the present invention.

Next, a motor 200 according to a third embodiment of the present invention will be described below with reference to FIG. 10. In the following description, unless otherwise noted, each component identical with a component in the first embodiment is assigned the same reference character as in the first embodiment and repeated explanation thereof is omitted.

The motor 200 includes a guide wall 32 formed at an opening of each through hole 11 on the end plate 9 side. The guide wall 32 is formed in a bell mouth shape, for example. The guide wall 32, extending towards the end plate 8 side, is formed of a part of the base part 17 of the end plate 9. Thus, the guide wall 32 is formed integrally with the base part 17 of the end plate 9. Further, the opening of the through hole 11 on the end plate 9 side is formed larger than an opening of the through hole 11 on the end plate 8 side so that the guide wall 32 does not interfere with an edge of the opening of the through hole 11. The base part 17 of the end plate 9 projects into the through hole 11 and thereby forms the guide wall 32. Incidentally, the guide wall 32 corresponds to a guide part in the present invention.

Also with the motor 200 configured as above, advantages similar to those in the first embodiment are obtained.

Further, since the guide wall 32 extending towards the end plate 8 side is formed at the opening of each through hole 11 on the end plate 9 side in the above-described third embodiment, air flows into each through hole 11 along the guide wall 32 and noise occurring when the air flows into the through hole 11 through the hole 19 can be reduced.

Furthermore, the production cost can be reduced since the guide wall 32 is formed integrally with the base part 17 of the end plate 9.

Moreover, since the hole 19 formed in the end plate 9 is formed larger than the through hole 11 formed in the rotor core 5, interference of the guide wall 32 with the hole 19 can be inhibited.

Incidentally, the guide wall 32 may be employed for the motors in the first and second embodiments, and similar advantages are obtained also in such cases.

Fourth Embodiment

Figure 11:
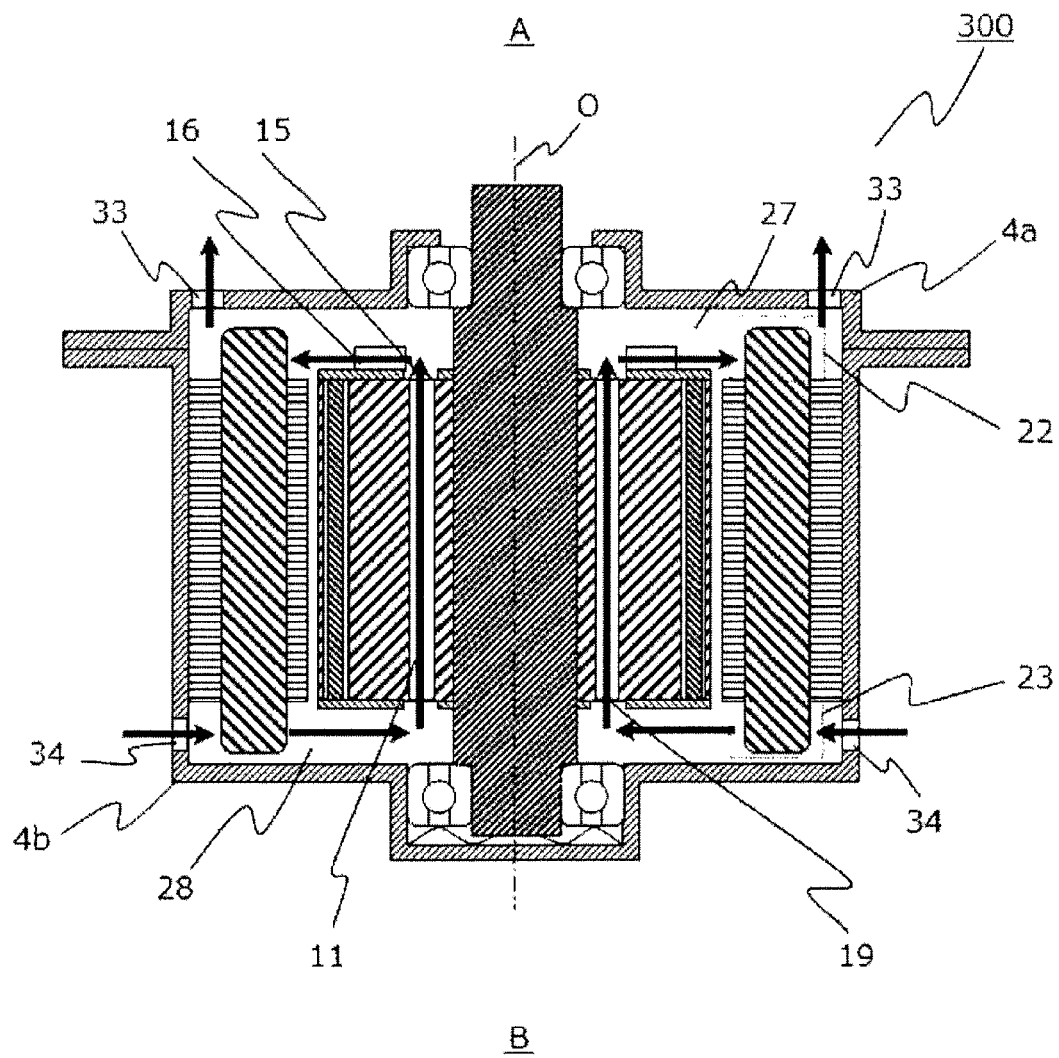
FIG. 11 is a cross-sectional view of a motor according to a fourth embodiment of the present invention.

Next, a motor 300 according to a fourth embodiment of the present invention will be described below with reference to FIG. 11. In the following description, unless otherwise noted, each component identical with a component in the first embodiment is assigned the same reference character as in the first embodiment and repeated explanation thereof is omitted. Incidentally, arrows in FIG. 11 indicate the flow of air.

The motor 300 includes vent holes 33 formed in the frame 4a and vent holes 34 formed in the frame 4b. The vent holes 33 are formed outside the coil end part 22 of the winding 21 in the radial direction. The vent holes 34 are formed outside the coil end part 23 in the radial direction. The vent holes 33 and the vent holes 34 connect the outside of the motor 300 and the inside of the motor 300 to each other. The sizes and the numbers of the vent holes 33 and the vent holes 34 are determined based on the air flow rate. Incidentally, the vent holes 33 and the vent holes 34 correspond to case opening parts in the present invention.

When the rotor 2 of the motor 300 rotates, air flows in the through holes 11 formed in the rotor core 5 from the holes 19 formed in the end plate 9 towards the holes 15 formed in the end plate 8. In this case, air channels having the vent holes 34 as air inlet ports and the vent holes 33 as air outlet ports are formed in the motor 300. Air flowing into the space 28 through the vent holes 34 hits the coil end part 23 and cools down the coil end part 23. Air blown off by the blades 16 outward in the radial direction of the end plate 8 cools down the coil end part 22 and thereafter flows outside the motor 300 through the vent holes 33.

Also with the motor 300 configured as above, advantages similar to those in the first embodiment are obtained.

Further, since the vent holes 33 are formed in the frame 4a outside the coil end part 22 of the winding 21 in the radial direction and the vent holes 34 are formed in the frame 4b outside the coil end part 23 of the winding 21 in the radial direction in the above-described fourth embodiment, air channels are formed in the motor 300 when the rotor 2 rotates, by which the coil end part 22 and the coil end part 23 can be cooled down effectively.

Incidentally, the vent holes 33 and the vent holes 34 may be employed for the motors in the first to third embodiments, and similar advantages are obtained also in such cases.

Incidentally, while examples in which the side A as the upper side in FIG. 1 is the load side and the side B as the lower side in FIG. 1 is the anti-load side have been described in the above first to fourth embodiments, they are just examples for illustration and the load side and the anti-load side may be set inversely.

Further, while examples in which the cooling medium circulating in the motor 1 is air have been described in the above first to fourth embodiments, similar advantages are obtained even if the cooling medium is a medium other than air. For example, oil, water, and so forth may be used as the cooling medium. However, the cooling medium is not limited to these media.

Fifth Embodiment

Figure 12:
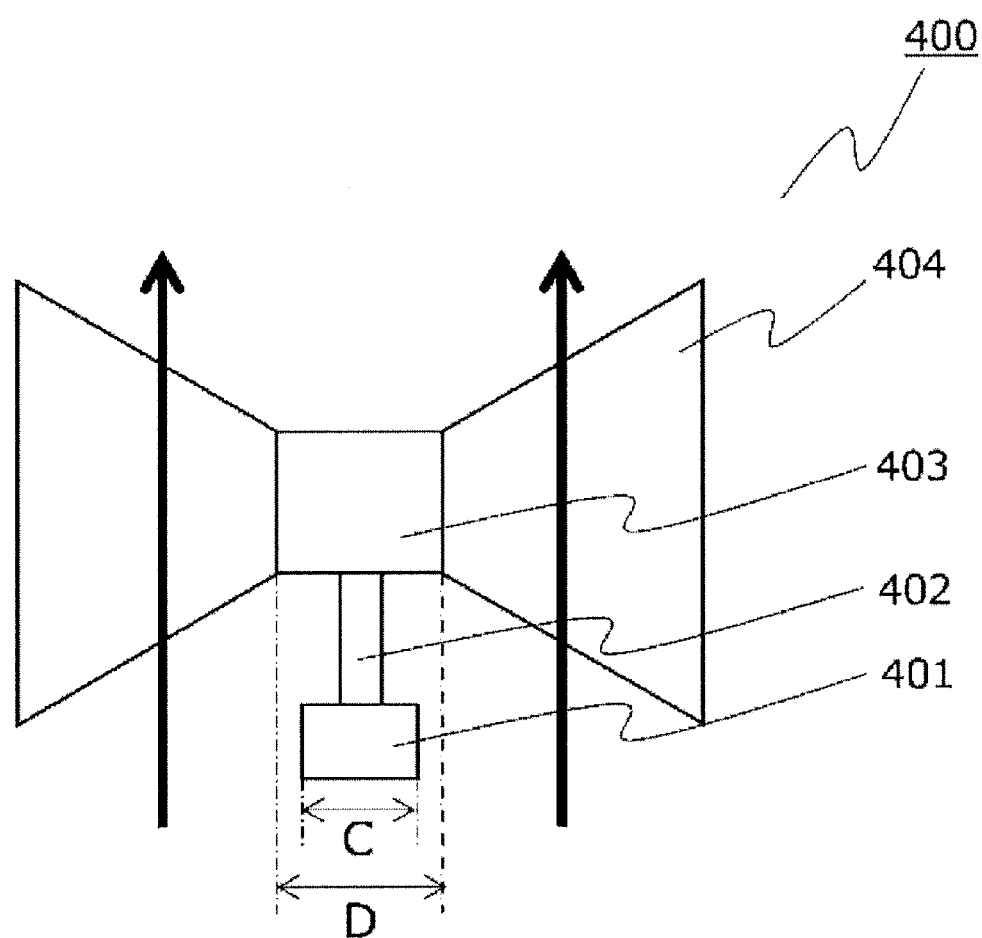
FIG. 12 is a diagram showing a blower including the motor according to the present invention.

Next, a blower 400 according to a fifth embodiment of the present invention will be described below with reference to FIG. 12. Incidentally, arrows in FIG. 12 indicate the flow of air.

The blower 400 includes a motor 401 having a rotary shaft 402, a boss 403 fixed to the rotary shaft 402, and a plurality of vanes 404 connected to an outer circumferential surface of the boss 403. Incidentally, one of the motors 1, 100, 200 and 300 described in the first to fourth embodiments is used as the motor 401, in which the rotary shaft 402 corresponds to the rotary shaft 6.

When the motor 401 operates, the rotary shaft 402 rotates and the boss 403 and the vanes 404 rotate. When the boss 403 and the vanes 404 rotate, a flow of air passing through the vanes 404 in the axial direction occurs. Here, the size of the boss 403 is larger than or equal to the external diameter of the motor 401. Specifically, the width C of the motor 401 and the width D of the boss 403 in a direction orthogonal to the rotary shaft 402 satisfy a relationship C≤D. With this configuration, influence of the motor 401 on the air passing through the vanes 404 can be reduced.

Meanwhile, a flow of air passing through the inside of the motor 401 is caused by the aforementioned blades 16. That is, the motor 401 is capable of causing an air flow cooling down the rotor 2 in addition to the air flow passing through the vanes 404. As above, it is possible to increase the coolability of the rotor 2 and to reduce the influence on the air passing through the vanes 404.

Incidentally, the product to which the motor according to the present invention is applied is not limited to a blower; the motor according to the present invention may be installed in different types of products.

What is claimed is:

1. A motor comprising a rotor including: a rotor core to rotate on a rotary shaft; permanent magnets inserted in magnet insertion holes formed in the rotor core; first and second end plates provided on both end faces of the rotor core respectively in an axial direction; and a stator arranged outside the rotor and including a stator core and a winding wound around the stator core, wherein the winding has a coil end part projecting in the axial direction from the stator core, the first end plate includes a base part covering one end of the magnet insertion holes, a blade part provided on a surface of the base part, the second end plate is not provided with parts corresponding to the blade part of the first end plate, the rotor includes a cooling hole having an opening between the blade part of the first end plate and the rotary shaft and passing through the rotor core and the second end plate, the first end plate includes a first opening communicating with the cooling hole, the second end plate includes a second opening communicating with the cooling hole, the second opening of the second end plate is larger than the first opening of the first end plate, during a rotation of the rotor, the blade part generates pressure difference between both ends of the rotor in the axial direction, and 2 the blade part faces the coil end part in a radial direction of the rotor, wherein a guide part extending towards the first end plate is formed in an opening part of the cooling hole on a second end plate side, wherein the guide part is formed integrally with the second end plate.

2. The motor according to claim 1, wherein the blade part is formed integrally with the first end plate.

3. The motor according to claim 1, wherein an outside end part of the blade part is situated at a rear of an inside end part of the blade part in a rotation direction of the rotor.

4. The motor according to claim 1, wherein the magnet insertion holes are covered with the first end plate and the second end plate.

5. The motor according to claim 1, further comprising a case housing the rotor and the stator, wherein
the case has a case opening part outside the coil end part in a radial direction, and
the case opening part connects an inside of the case and an outside of the case to each other.

6. The motor according to claim 1, further comprising a disk covering the blade part.

7. A blower comprising the motor according to claim 1.

* * * * *